United States Patent
Tsai et al.

(10) Patent No.: US 8,597,860 B2
(45) Date of Patent: Dec. 3, 2013

(54) DUMMY PATTERNS AND METHOD FOR GENERATING DUMMY PATTERNS

(75) Inventors: Chen-Hua Tsai, Hsinchu County (TW); Jian-Cheng Chen, New Taipei (TW); Chin-Yueh Tsai, Taichung (TW); Yao-Jen Fan, Chiayi (TW); Heng-Kun Chen, Tainan (TW); Hsiang Yang, Hsinchu County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 234 days.

(21) Appl. No.: 13/111,980

(22) Filed: May 20, 2011

(65) Prior Publication Data

US 2012/0295187 A1    Nov. 22, 2012

(51) Int. Cl.
 *G03F 1/36* (2012.01)
 *G03F 1/68* (2012.01)

(52) U.S. Cl.
 USPC .............................................. 430/5; 430/394

(58) Field of Classification Search
 USPC .......................................... 430/5, 30; 716/55
 See application file for complete search history.

(56) References Cited

U.S. PATENT DOCUMENTS

| | | | |
|---|---|---|---|
| 6,099,992 A * | 8/2000 | Motoyama et al. | 430/5 |
| 7,013,446 B2 | 3/2006 | Ohba et al. | |
| 7,112,495 B2 | 9/2006 | Ko et al. | |
| 2007/0015365 A1 | 1/2007 | Chen et al. | |
| 2007/0072376 A1 | 3/2007 | Chen et al. | |
| 2007/0174802 A1* | 7/2007 | Shin et al. | 716/8 |
| 2007/0190811 A1* | 8/2007 | Park et al. | 438/800 |
| 2008/0061366 A1 | 3/2008 | Liu et al. | |
| 2009/0057769 A1 | 3/2009 | Wei et al. | |
| 2010/0009273 A1* | 1/2010 | Kim | 430/5 |
| 2010/0044783 A1 | 2/2010 | Chuang et al. | |
| 2010/0129994 A1 | 5/2010 | Awad et al. | |

* cited by examiner

*Primary Examiner* — Stephen Rosasco
(74) *Attorney, Agent, or Firm* — Winston Hsu; Scott Margo (57) ABSTRACT

A method for generating dummy patterns includes providing a layout region having a layout pattern with a first density, inserting a plurality of first dummy patterns with a second density corresponding to the first density in the layout pattern, dividing the layout region into a plurality of sub-regions with a third density, adjusting a size of the first dummy pattern according to a difference between the second density and the third density, and outputting the layout pattern and the first dummy patterns on a photomask.

10 Claims, 8 Drawing Sheets

DUMMY PATTERNS AND METHOD FOR GENERATING DUMMY PATTERNS

BACKGROUND OF THE INVENTION

1. Field of the Invention

The invention relates to dummy patterns and a method for generating dummy patterns, and more particularly, to dummy patterns and a method for generating dummy patterns used in planarization process.

2. Description of the Prior Art

Along with an increase in speed of semiconductor devices, downsizing and higher integration of elements, such as transistors and multilevel interconnects are now in progress. An ever increasing accuracy and precision for forming circuit layout with higher density on the wafer is therefore required. Of course, those of ordinary skill in the art will easily recognize that layout with higher density requires better surface flatness of the wafer for increasing the accuracy for forming the layout pattern. Conventionally, chemical mechanical polishing (CMP) process is an effective and important method for wafer planarization. And result of CMP becomes critical for forming necessary elements. In detail, wafer regions with a low pattern density are known to be etched faster than wafer regions with high pattern density. Thus, for a given etch time, a disproportionately greater amount of material is etched from the low pattern density regions than the high pattern density regions. Accordingly, thickness in the low pattern density regions is smaller than that in the high pattern density regions, and thus an uneven surface having film thickness variation, dishing, or erosion is resulted. Besides the thickness variation problem, the uneven surface after CMP process further suffers serious problems such as pattern size error and poor critical size uniformity (CDU). Furthermore, it is found that different pattern densities also adversely impact other semiconductor process such as patterning process or etching process. For example, over-etching and/or incomplete etching may be resulted due to the different pattern densities on one wafer.

As a countermeasure against to the above problems, there have been proposed a method in which dummy patterns are randomly positioned in the low pattern density regions. By positioning the dummy patterns in the low pattern density regions, the pattern density is raised. Accordingly, the approach of inserting dummy patterns between design patterns is now essential for controlling variations in the flatness of the surface of a wafer or a chip.

However, the conventional approach uses dummy patterns with identical shape and size arranged in an array. Though the dummy patterns alleviate density difference between the low pattern density regions and the high pattern density regions, it is no longer competent when the wafer or the chip is formed to have more regions with varied densities due to the complexity of the integrated circuit (IC) design. Furthermore, the conventional dummy patterns also suffer from several drawbacks and limitations such as being irresistible to stress between regions with different pattern densities and increases optical proximity correction (OPC) processing time.

In view of the above, there exists a need for innovative dummy patterns and a smart method for generating dummy patterns.

SUMMARY OF THE INVENTION

According to an aspect of the present invention, there is provided a method for generating dummy patterns. The method includes steps of providing a layout region having a layout pattern with a first density, inserting a plurality of first dummy patterns with a second density corresponding to the first density in the layout pattern, dividing the layout region into a plurality of sub-regions with a third density, adjusting a size of the first dummy pattern according to a difference between the second density and the third density, and outputting the layout pattern and the first dummy patterns on a photomask.

According to another aspect of the present invention, there is provided a semiconductor layout pattern having dummy patterns. The semiconductor layout pattern includes a device layout pattern, a plurality of rectangular first dummy patterns having a first size, and a plurality of rectangular second dummy patterns having varied second sizes.

According to the dummy patterns and the method for generating dummy patterns provided by the present invention, the first dummy patterns having the second density corresponding to the first density of the layout pattern is formed in the layout region for preliminarily equalizing the pattern densities in the layout region. Then, the layout region is divided into the sub-regions for checking sub-region by sub-region and thus the third density of each sub-region is obtained. Thereafter, the size of the first dummy patterns in each sub-region is adjusted according the difference between the third density and the second density. Therefore the pattern densities in each sub-region are further precisely adjusted. In other words, by adjusting the size of the first dummy pattern in each sub-region, the pattern densities, which are originally different from each other, of the sub-regions are smartly adjusted and equalized. Accordingly, the sub-regions obtaining equalized densities are beneficial to the CMP process and improve the CMP result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2-8 are drawings illustrating the method for generating dummy patterns according to the first and the second preferred embodiments, wherein

DETAILED DESCRIPTION

Figure 1:
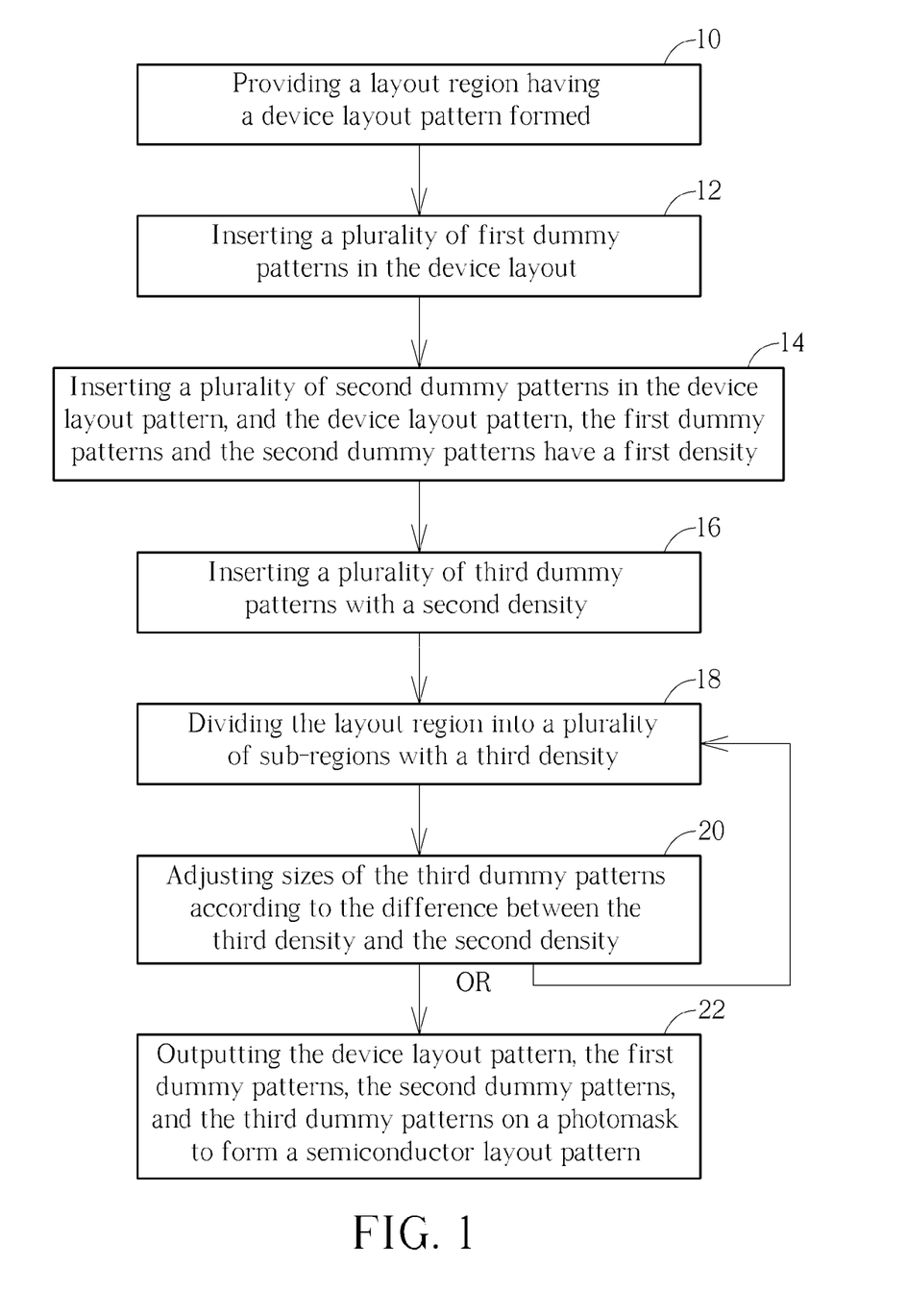
FIG. 1 is a flowchart illustrating a method for generating dummy patterns according to a first preferred embodiment and a second preferred embodiment of the present invention.
Figure 2:
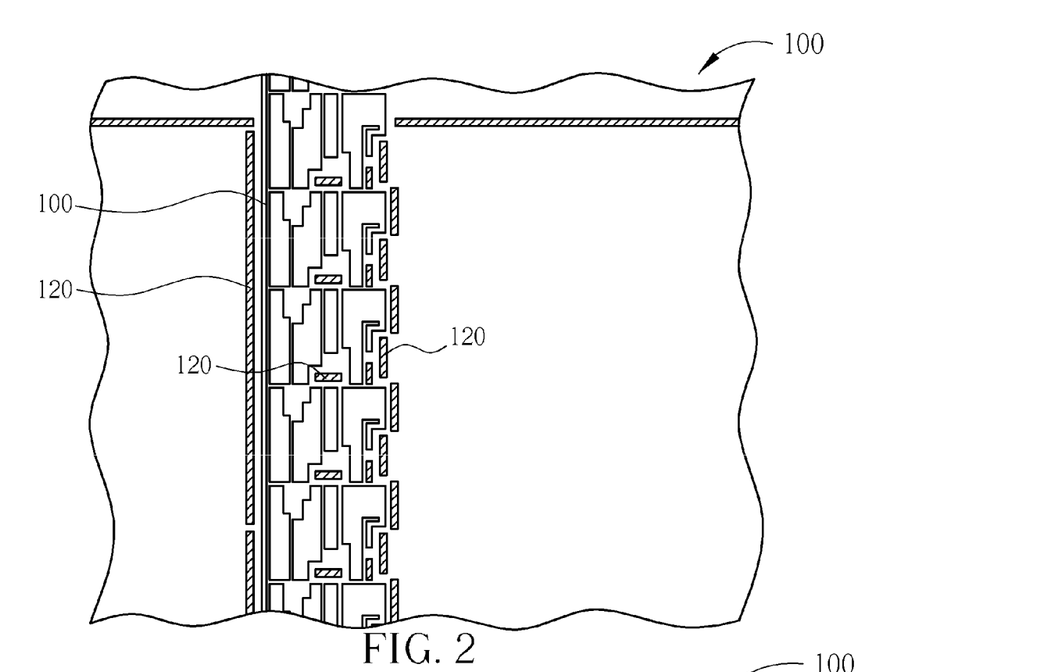
Figure 3:
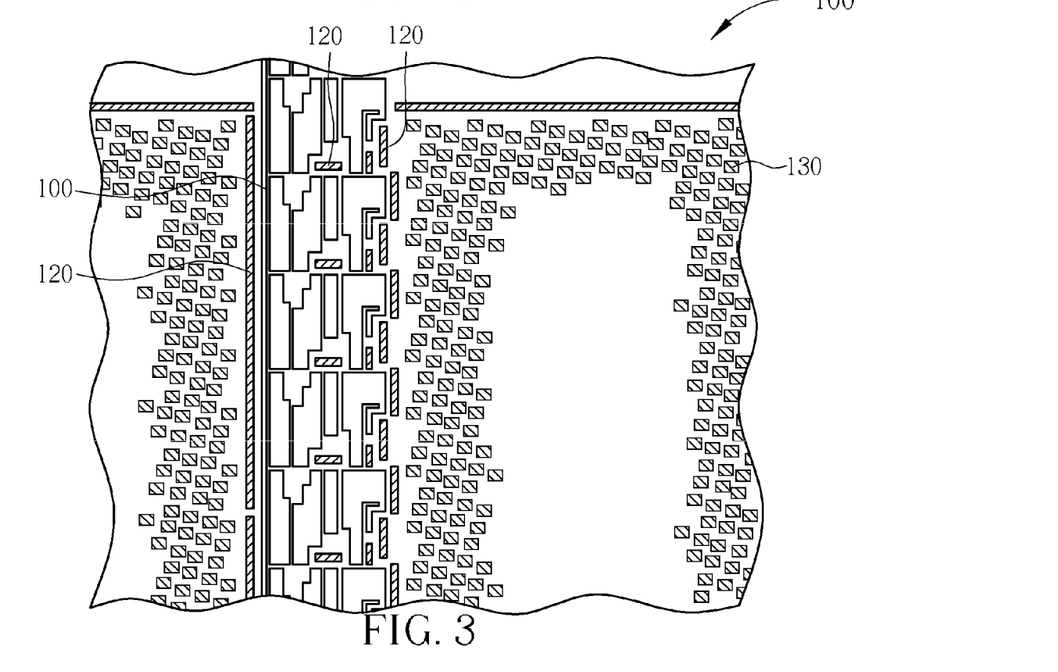
Figure 4:
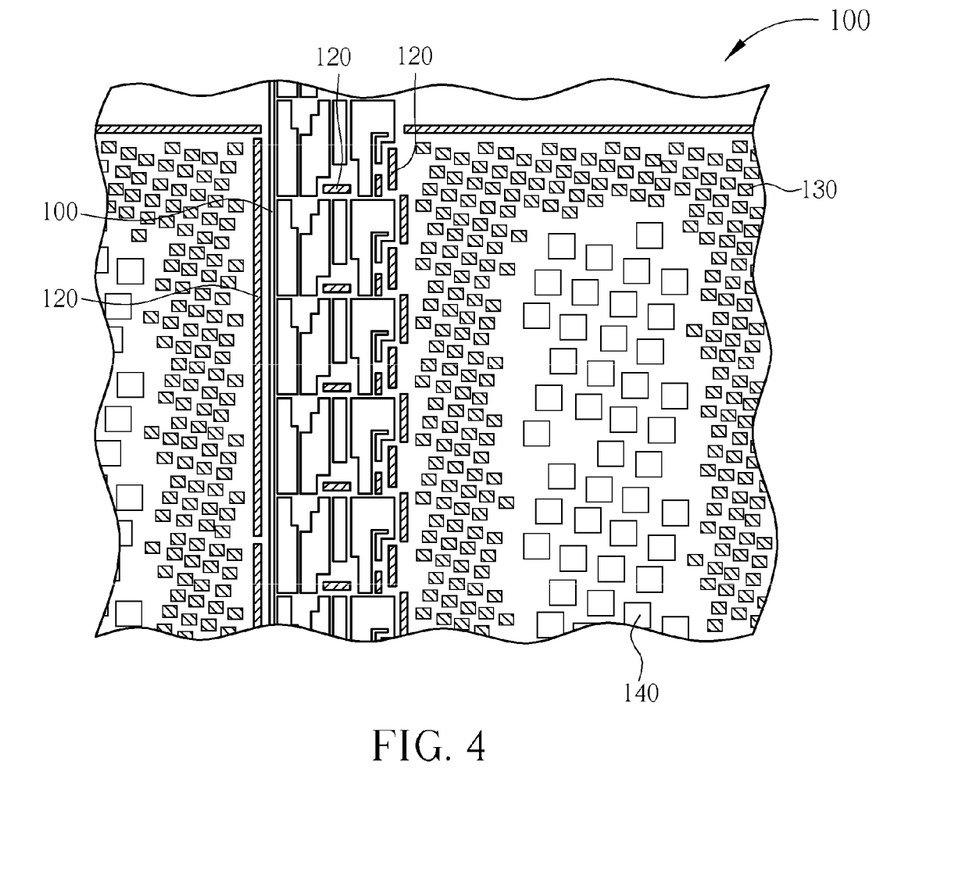
Figure 5:
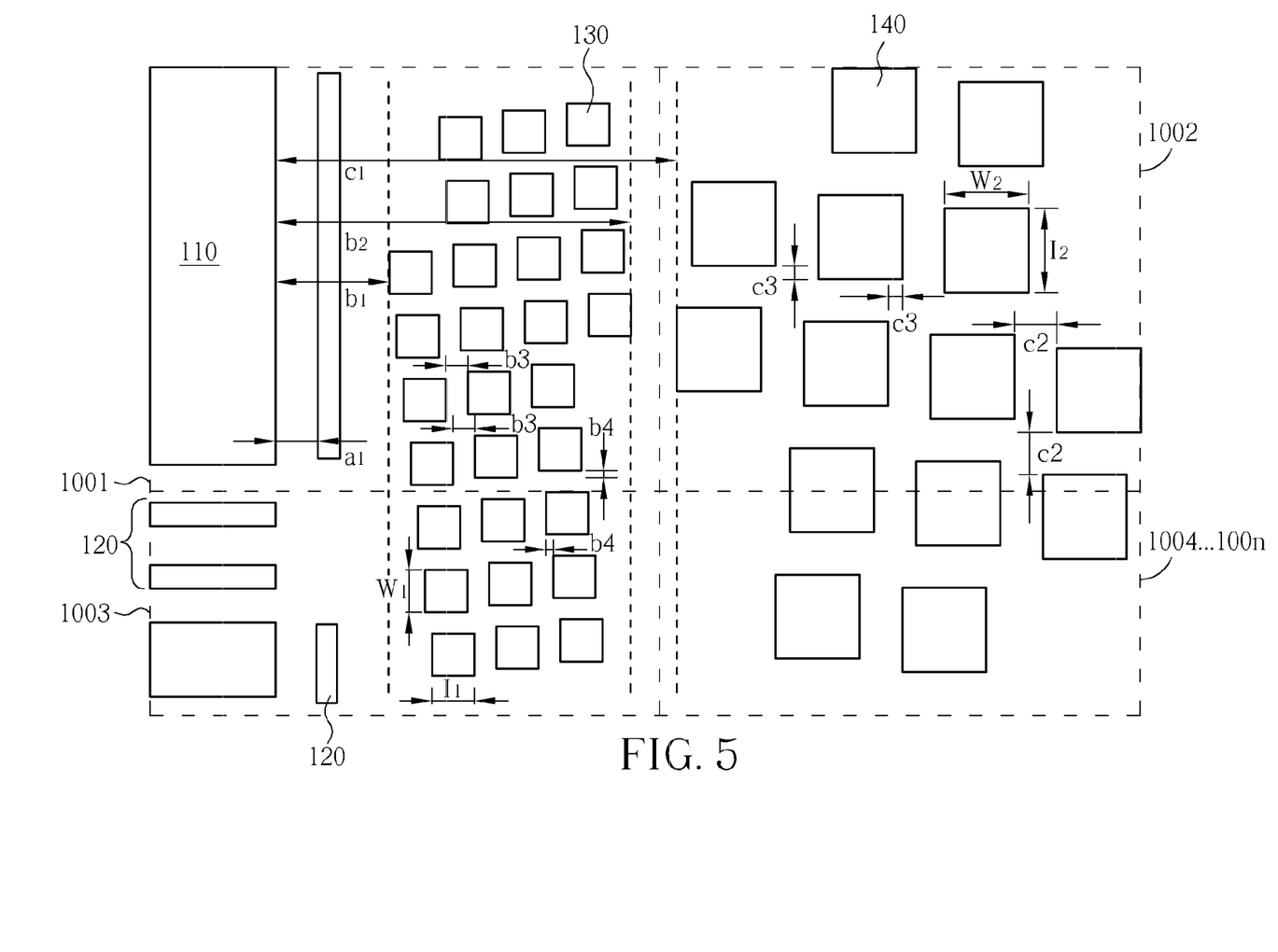
FIG. 5 is an enlarged view of a portion of FIG. 4.

Please refer to FIGS. 1-8, wherein FIG. 1 is a flowchart illustrating a method for generating dummy patterns according to a first preferred embodiment of the present invention, FIGS. 2-8 are drawings illustrating the method for generating dummy patterns according to the first preferred embodiment, and FIG. 5 is an enlarged view of a portion of FIG. 4. As shown in FIG. 1 and FIG. 2, the preferred embodiment first performs:

Step 10: Providing a Layout Region Having a Device Layout Pattern Formed Therein It is well-known to those skilled in the art that an original circuit layout patterns designed by the circuit design engineer is outputted on a photomask, and then transferred to an object layer by photolithography and etching processes for producing a product that satisfies the electrical function of the original circuit design. In the preferred embodiment, the layout region 100 includes a region on a photomask that used to form layout patterns on an object layer, and FIG. 2 illustrates a portion of the layout region 100. The device layout pattern 110 provided by the preferred embodiment includes the device layout pattern designed by the circuit design engineer, such as interconnect layout patterns or circuit layout patterns, but not limited to this. In addition, the device layout pattern includes not only the efficient circuit but also the dummy patterns (not shown) designed by the circuit design engineer. Please refer to FIG. 1, FIG. 2 and FIG. 5:

Step 12: Inserting a Plurality of First Dummy Patterns in the Device Layout Pattern According to Step 12, a plurality of the first dummy patterns 120 is inserted in the device layout pattern 110. It is noteworthy that the first dummy patterns 120 include bar-like dummy patterns. And the first dummy patterns 120 are positioned in between the device layout pattern 110 or arranged to surround the device layout pattern 110 discontinuously as shown in FIG. 2. Furthermore, a length of each first dummy pattern 120 can be adjusted according to the spatial relationship between the first dummy pattern 120 and the device layout pattern 110. In other words, each first dummy pattern 120 has a first size, and the first sizes are varied depending on the spatial relationship between the first dummy pattern 120 and the device layout pattern 110. As shown in FIG. 5, a spacing width $a_1$ is between the first dummy pattern 120 and the device layout pattern 110. According to the preferred embodiment, the spacing width $a_1$ is exemplarily 0.2 micrometer (μm), but not limited to this. It is noteworthy that the spacing width $a_1$ can be the minimum spacing width fulfills the design rule to the device layout patterns 110. However a maximum of the spacing width $a_1$ can be smaller 2 μm. Furthermore, the first dummy patterns 120 can be single bar-like patterns as shown in FIG. 2, but the first dummy patterns 120 still can be multiple bar-like patterns that is preferably used in double patterning technology (DPT).

It should be easily realized that when forming a layout pattern in an object layer, the contiguous areas between the iso region and the dense region always bear greater stress due to the different pattern densities between the iso region and the dense region. It results serious defect, such as pattern distortion during the manufacturing process. To provide a countermeasure against to the problems, the preferred embodiment positions the first dummy patterns 120 substantially surrounding each device layout pattern 110. The first dummy patterns 120 shield the device layout patterns from the stress, and thus pattern distortion is avoided.

Figure 8:
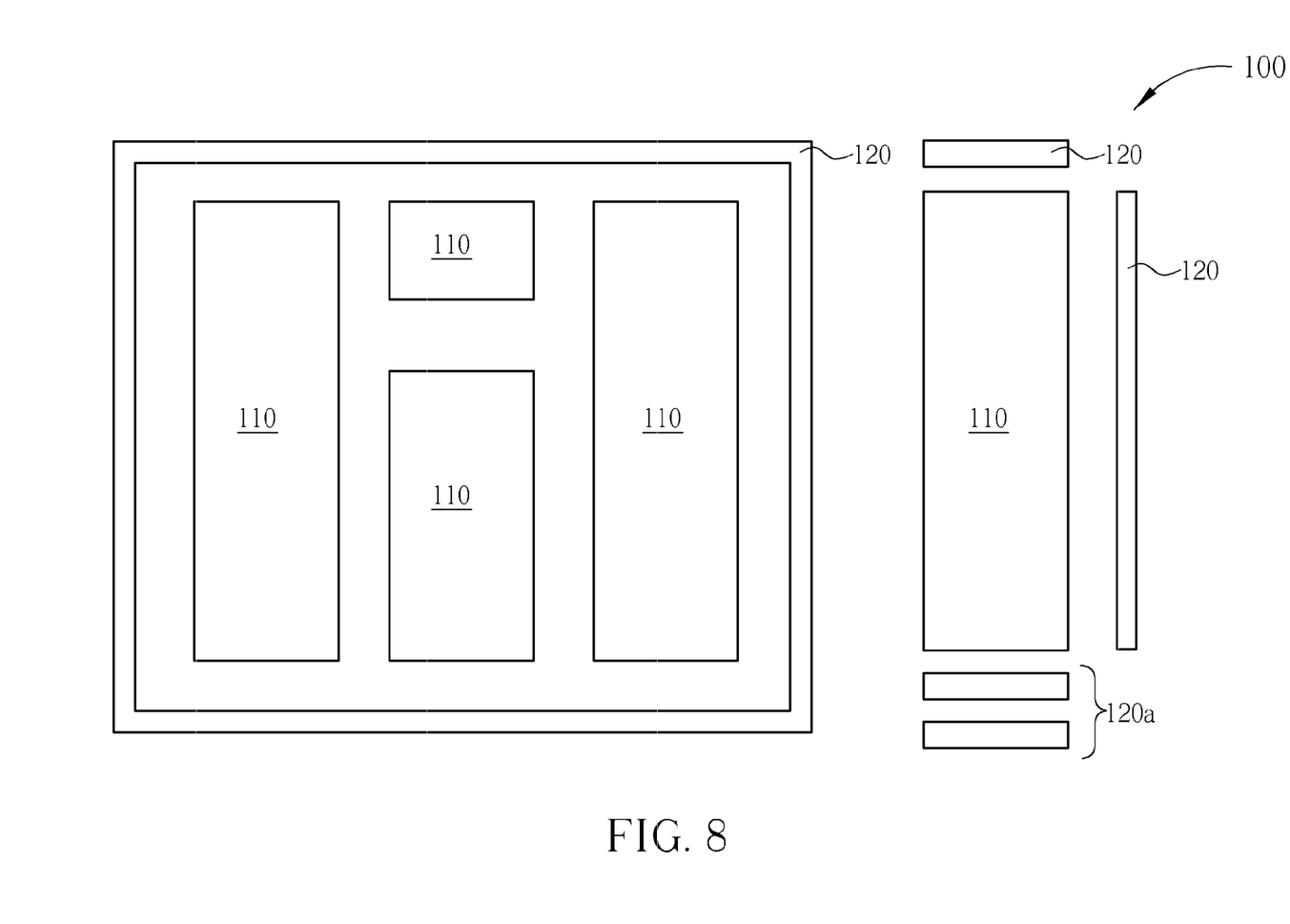
FIG. 8 is a simplified diagram of another modification to the preferred embodiments.

Please refer to FIG. 8, which is a simplified diagram of a modification to the preferred embodiment. Although only the first dummy patterns 120 and the device layout pattern 110 are illustrated for emphasizing the relationship between the first dummy pattern 120 and the device layout pattern 110 while other elements are omitted, it should be easily realize that other dummy patterns can be included in the modification. As shown in FIG. 8, the first dummy pattern 120 provided by the modification includes a close pattern that completely surrounding the device layout pattern 110 in a specific region. In addition, the first dummy pattern 120 can be a single-line structure or a multi-lines structure 120a as shown in FIG. 8. Next, please refer to FIG. 1, FIG. 3 and FIG. 5:

Step 14: Inserting a Plurality of Second Dummy Patterns in the Device Layout Pattern, and the Device Layout Pattern, the First Dummy Patterns and the Second Dummy Patterns have a First Density According to Step 14, a plurality of second dummy patterns 130 is inserted in the device layout pattern 110. The second dummy patterns 130 are arranged in an array in the layout region 100 as shown in FIG. 3 and FIG. 5. It is noteworthy that a spacing width $b_1$ is between a second dummy pattern 130 that proximal to the device layout pattern 110 and the device layout pattern 110, a spacing width $b_2$ is between a dummy pattern 130 that distal to the device layout pattern 110 and the device layout pattern 110, and a spacing width $b_3$ is between each of the second dummy patterns 130. In the preferred embodiment, the spacing width $b_1$ is larger than or equal to 0.6 μm, spacing width $b_2$ is about 2.6 μm, and spacing width $b_3$ is between 90 nanometer (nm) and 210 nm. However, the spacing width $b_1$ and the spacing width $b_2$ can be adjusted according to requirement to the process or to the products. The spacing width $b_3$ between each second dummy pattern 130 are also adjustable as long as a precondition that no OPC is performed is met. The second dummy patterns 130 are rectangular dummy patterns and preferably are square dummy patterns. As shown in FIG. 5, the second dummy patterns 130 include a length $l_1$ and a width $w_1$, which are between 240 nm and 360 nm. It is noteworthy that the shapes and sizes of each second dummy pattern 130 are all identical. In other words, the second dummy patterns 130 include fixed second sizes. Furthermore, an offset distance $b_4$ is existed between each second dummy pattern 130 along both of the X-direction and Y-direction. In the preferred embodiment, the offset distance $b_4$ is between 0 nm and 300 nm, but not limited to this. It is also noteworthy that the device layout pattern 110, the first dummy patterns 120, the second dummy patterns 130 form a layout pattern, and the layout pattern includes a first density X.

It is well-known to those skilled in the art that after forming the layout pattern in the object layer, specifically, after forming the trench layout pattern of interconnects, a filling process is performed to fill the trench layout pattern with metal material. It is always observed that the filling speed in the iso region or at the edge of the dense region is much lower than the filling speed in the iso region. Consequently defect that the trenches are not filled up is found in the iso region or at the edge of the dense region. To provide a countermeasure against to the problems, the preferred embodiment positions the second dummy patterns 130 substantially around the device layout pattern 110. Accordingly, pattern density in the iso region and at the edge of the dense region is increased, and thus a dense pattern environment is formed around the device layout pattern 110. Thus the filling speed in the iso region and at the edge of the dense region is increased and the filling result of the filling process is improved. Then, please refer to FIG. 1, FIG. 4 and FIG. 5:

Step 16: Inserting a Plurality of Third Dummy Patterns with a Second Density

According to Step 16, a plurality of third dummy patterns 140 is inserted in the layout pattern (including the device layout pattern 110, the first dummy patterns 120 and the second dummy patterns 130). The third dummy patterns 140 are arranged in an array in the layout region 100 as shown in FIG. 4 and FIG. 5. A spacing width $c_1$ is between a third dummy pattern 140 that proximal to the device layout pattern 110 and the device layout pattern 110. In the preferred embodiment, the spacing width $c_1$ is larger than 3 μm, however the spacing width $c_1$ is adjustable according to requirement to the process or to the products. The third dummy patterns 140 are rectangular dummy patterns, and preferably are square dummy patterns. As shown in FIG. 5, the third dummy patterns 140 include a length $l_2$ and a width $w_2$, and the length $l_2$ and the width $w_2$ are both between 460 nm and 740 nm. In addition, a spacing width $c_2$ between each third dummy pattern 140 is between 160 nm and 440 nm. An offset distance $c_3$ is existed between each third dummy pattern 140 along both of the X-direction and Y-direction. In the preferred embodiment, the offset distance $c_3$ is between 100 nm and 600 nm, but not limited to this. As shown in FIG. 4 and FIG. 5, the first dummy patterns 120 and the second dummy patterns 130 are positioned between the third dummy patterns 140 and the device layout pattern 110, and the first dummy patterns 120 are positioned between the second dummy patterns 130 and the device layout pattern 110.

It is noteworthy that the third dummy patterns 140 are positioned with a second density Y, and the second density Y is corresponding to the first density X. As mentioned above, the first density X is the density of the device layout pattern 110, the first dummy patterns 120 and the third dummy patterns 130 according to the preferred embodiment. Therefore the third dummy patterns 140 are positioned with the second density Y decided according to the first density X as shown in Table 1:

TABLE 1

| the first density X | the second density Y |
|---|---|
| X < 37.4% | 34.8% |
| 37.4% ≤ X < 42.7% | 40.0% |
| 42.7% ≤ X < 48.5% | 45.5% |
| 48.5% ≤ X < 54.4% | 51.3% |
| 54.4% ≤ X | 57.6% |

For example, when the first density X is larger than or equal to 37.4% and smaller than 42.7%, the second density Y is decided to be 40.0%. Accordingly the third dummy patterns 140 are positioned to have the second density Y of 40.0%. Furthermore, in the preferred embodiment, the second density Y serves as a target density set for the whole semiconductor layout pattern. It should be noticed that though only 5 ranges are provided by the preferred embodiment, more ranges and corresponding target densities can be provided to further improve uniformity of the layout patterns. Please refer to FIG. 1 and FIG. 5, then Step 18 is performed:

Step 18: Dividing the Layout Region into a Plurality of Sub-Regions with a Third Density According to Step 18, the layout region 100 is divided into a plurality of sub-regions 1001, 1002, 1003 . . . 100n. The sub-regions 1001, 1002, 1003 . . . 100n include identical length and width. For example, the length and the width of the sub-regions are all 125 μm in the preferred embodiment. However the length and width of the sub-regions 1001, 1002, 1003 . . . 100n are not limited to this. As shown in FIG. 5, the sub-regions 1001, 1002, 1003 . . . 100n may include the device layout pattern 110, the first dummy patterns 120 and the second dummy patterns 130, or include the second dummy patterns 130 and the third dummy patterns 140. The sub-regions 1001, 1002, 1003 . . . 100n may include only the third dummy patterns 140. After obtaining the sub-regions 1001, 1002, 1003 . . . 100n, densities of each sub-region 1001, 1002, 1003 . . . 100n are calculated and thus the third densities Z of each sub-region are obtained. Since the sub-regions 1001, 1002, 1003 . . . 100n include 1 to 4 kinds of patterns, the third densities Z of the sub-regions have a large variation. In other words, there are many differences between the second density Y (the target density) and the third densities Z of the sub-regions 1001, 1002, 1003 . . . 100n.

Figure 6:
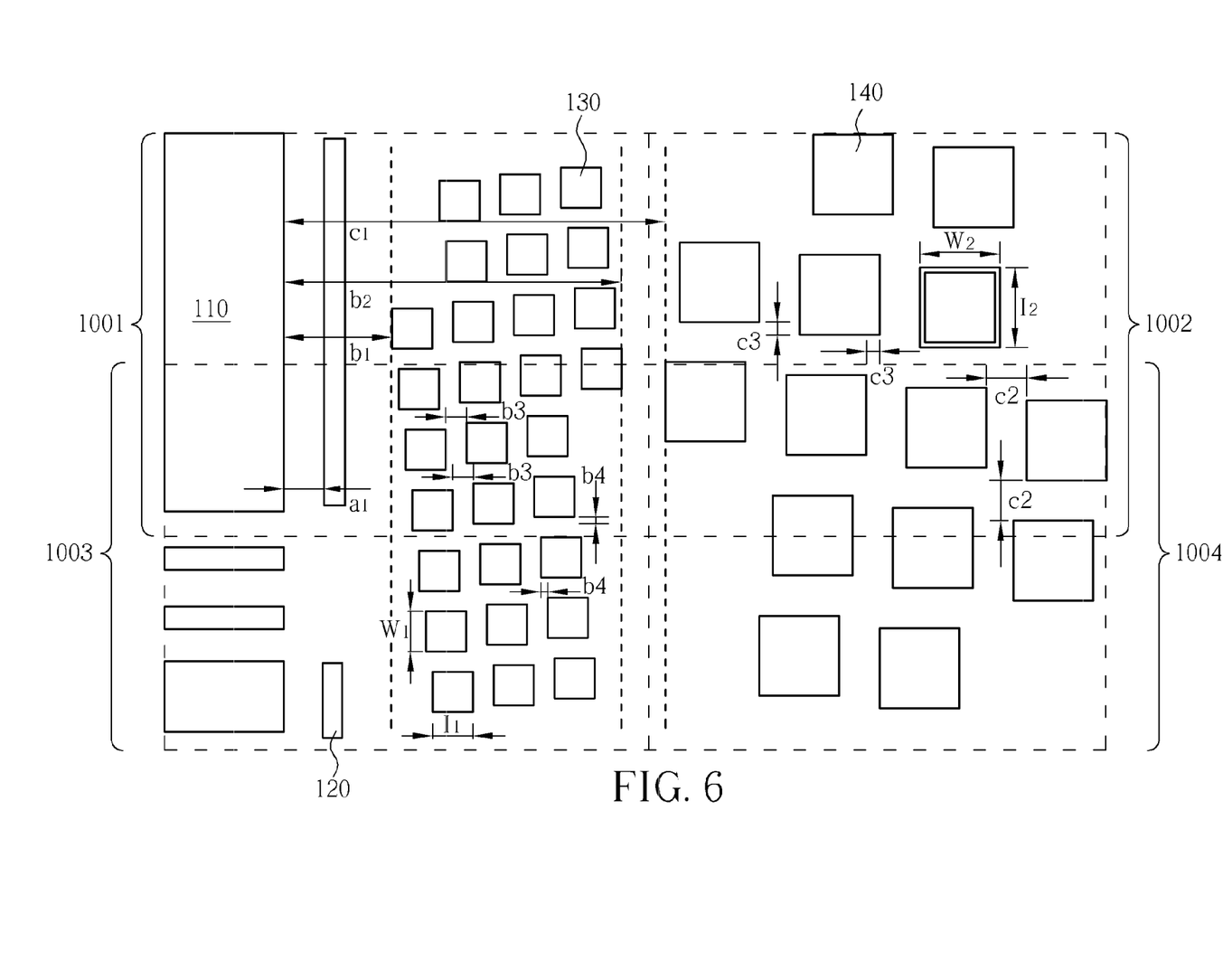
FIG. 6 is a schematic drawing illustrating a modification to the preferred embodiments.
Figure 7:
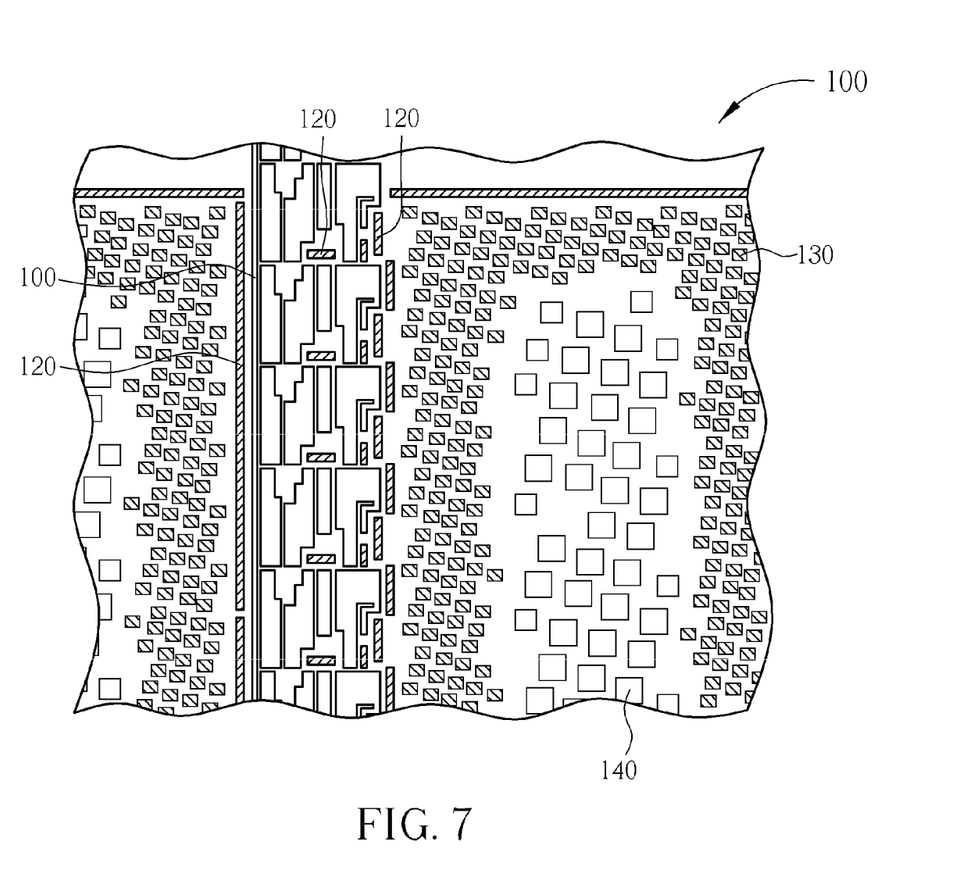

In addition, please refer to FIG. 6, which is a schematic drawing illustrating a modification to the preferred embodiment. According to the modification, the sub-regions 1001, 1002, 1003 . . . 100n overlap to each other. Please refer to FIG. 1 and FIG. 7. Then Step 20 is performed:

Step 20: Adjusting Sizes of the Third Dummy Patterns According to the Difference Between the Third Density and the Second Density As mentioned above, since each third density Z of each sub-region 1001, 1002, 1003 . . . 100n is difference from the second density Y (the target density), the size of the third dummy patterns 140 in each sub-region 1001, 1002, 1003 . . . 100n are adjusted according to the difference between the third density Z of individual sub-region and the second density Y. By adjusting the size of the third dummy patterns 140 in each sub-region 1001, 1002, 1003 . . . 100n, pattern density of each sub-region 1001, 1002, 1003 . . . 100n is consequently adjusted. Therefore the pattern densities of the sub-regions are equalized to substantially match the second density Y (the target density). In the preferred embodiment, there are correlations between the second density Y, the third density Z and the size of the third dummy patterns 140 as shown in Table 2 and Table 3:

TABLE 2

| The third density Z | The second density Y = 34.8% | The second density Y = 40.0% | The second density Y = 45.5% | The second density Y = 51.3% | The second density Y = 57.6% |
|---|---|---|---|---|---|
| 59.2% < Z | o | o | m | k | i |
| 56% < Z ≤ 59.2% | o | n | l | j | h |
| 52.8% < Z ≤ 56% | o | m | k | i | g |
| 49.9% < Z ≤ 52.8% | n | l | j | h | f |
| 47% < Z ≤ 49.9% | m | k | i | g | e |
| 44.1% < Z ≤ 47% | l | j | h | f | d |
| 41.3 < Z ≤ 44.1% | k | i | g | e | c |
| 38.7% < Z ≤ 41.3% | j | h | f | d | b |
| 36.1% < Z ≤ 38.7% | i | g | e | c | a |
| 33.6% < Z ≤ 36.1% | h | f | d | b | a |
| 31.2% < Z ≤ 33.6% | g | e | c | a | a |
| 28.8% < Z ≤ 31.2% | f | d | b | a | a |
| 26.6% < Z ≤ 28.8% | e | c | a | a | a |
| 24.5% < Z ≤ 26.6% | d | b | a | a | a |
| Z ≤ 24.5% | c | a | a | a | a |

TABLE 3

| code | pattern density V of the adjusted sub-region | size of the third dummy pattern (nm) |
|---|---|---|
| a | 60.80% | 740 × 740 |
| b | 57.60% | 720 × 720 |
| c | 54.40% | 700 × 700 |
| d | 51.30% | 680 × 680 |
| e | 48.50% | 660 × 660 |
| f | 45.50% | 640 × 640 |
| g | 42.70% | 620 × 620 |
| h | 40.00% | 600 × 600 |
| i | 37.40% | 580 × 580 |
| j | 34.80% | 560 × 560 |
| k | 32.40% | 540 × 540 |
| l | 30.00% | 520 × 520 |
| m | 27.70% | 500 × 500 |
| n | 25.60% | 480 × 480 |
| o | 23.50% | 460 × 460 |

For example, when the first density X is larger than or equal to 37.4% and smaller than 42.7%, the second density Y is decided to be 40.0%. In an exemplar when the third density Z of the sub-region 1001 is larger than 59.2%, a code "o" is obtained according to the table 2. The code "o" indicates sizes of the third dummy patterns 140 in the sub-region 1001 are subsequently adjusted to have the length $l_2$ and width $w_2$ being 460 nm according to the table 3. Accordingly, the pattern density V of the adjusted sub-region 1001 is lower to 23.50%, and thus the pattern density of the sub-region 1001 is equalized. In another exemplar, when the third density Z of another sub-region 100n is 24.5%, a code "a" is obtained according to the table 2. The code "a" indicates sizes of the third dummy patterns 140 in the sub-region 100n are subsequently adjusted to have the length $l_2$ and width $w_2$ being 740 nm according to the table 3. Accordingly, the pattern density V of the adjusted sub-region 100n is increased to 60.80%, and thus the pattern density of the sub-region 100n is equalized. By adjusting the sizes of the third dummy patterns 140 sub-region by sub-region, the pattern density of each sub-region is adjusted to match the second density Y (the target density). Accordingly, the density in the whole layout region 100 is substantially equal to the second density Y. In other words, an equalized density is obtained. Please refer to FIG. 1 again. Thereafter, a Step 22 is performed:

Step 22: Outputting the Device Layout Pattern, the First Dummy Patterns, the Second Dummy Patterns, and the Third Dummy Patterns on a Photomask to Form a Semiconductor Layout Pattern According to Step 22, a semiconductor layout pattern includes the device layout pattern 110, the first dummy patterns 120, the second dummy patterns 130, and the third dummy patterns 140 is outputted on a photomask and followed by performing necessary processes. The obtained semiconductor layout pattern has an advantage of superior uniformity. It is noteworthy that in the semiconductor layout pattern, the first dummy patterns 120 include the varied first sizes, the second dummy patterns 130 include the fixed second sizes, and the third dummy patterns 140 include the varied third sizes. More important, the second sizes of the second dummy patterns 130 are smaller than the third sizes of the third dummy patterns 140.

According to the first preferred embodiment, the first dummy patterns 120 are positioned in the device layout pattern 110 and surround the device layout pattern 110 for shielding the device layout pattern 110 from the stress caused by the different pattern densities between the iso region and the dense region. The second dummy patterns 120 are positioned in the layout region 100 to form a dense region environment for increasing filling speed in the iso region and at the edge of the dense region, and thus the filling result of the filling process is improved. More important, the preferred embodiment divides the layout region 100 into the sub-region 1001, 1002, 1003 . . . 100n after forming the third dummy patterns 140 and adjusts the sizes of the third dummy patterns 140 in each sub-region according to difference between the third density Z and the target density Y for smartly adjusting the pattern density of each sub-region to substantially match the target density. Accordingly, the pattern density in the whole layout region 100 is equalized and a semiconductor layout pattern having superior uniformity that is beneficial to the CMP process is obtained. Consequently, the CMP result is consequently improved.

Please refer to FIG. 1 again. FIG. 1 also illustrates a second preferred embodiment of the present invention. It is noteworthy that because most of the steps performed in the second preferred embodiment are the same with the first preferred embodiment, the same elements are designed by the same numerals, and the same steps that are the Step 10-Step 22 are illustrated as shown in FIGS. 2-8. Therefore the details are all omitted in the interest of brevity. The difference between the second preferred embodiment and the first preferred embodiment is: In the second preferred embodiment, the Step 18 (dividing the layout region 100 into the plurality of sub-regions 1001, 1002, 1003 . . . 100n with different third densities Z) and the Step 20 (adjusting the size of the third dummy patterns 140 according to the difference between the third density Z and the second density Y) are taken as a cycle and repeatedly performed. In other words, the Step 18 and the Step 20 are periodically performed.

It is noteworthy that the sizes of the sub-regions 1001, 1002, 1003 . . . 100n in each cycle are different from other cycles. Therefore the third density of the sub-regions 1001, 1002, 1003 can be different in each cycle. And the sizes of the third dummy patterns 140 in each sub-region are adjusted cycle by cycle, subsequently. Therefore the pattern density of each sub-region is adjusted many times in order to match the second density Y (the target density). Accordingly, by performing the cycle having the Step 18 and Step 20, the pattern densities V of the adjusted sub-region 1001, 1002, 1003 . . . 100n are optimized and the whole pattern density in the layout region 100 is equalized to match the second density Y and a semiconductor layout pattern having superior uniformity that is beneficial to the CMP process is obtained.

According to the second preferred embodiment, the first dummy patterns 120 are still positioned for shielding the device layout pattern 110 from the stress caused by the different pattern densities between the iso region and the dense region. The second preferred embodiment also provides the second dummy patterns 120 positioned in the layout region 100 to form a dense region environment for increasing filling speed in the iso region and at the edge of the dense region, and thus the filling result of the filling process is improved. More important, the preferred embodiment periodically performed the Step 18 and Step 20, that is to repeatedly divide the layout region 100 into the sub-regions 1001, 1002, 1003 . . . 100n after forming the third dummy patterns 140 and to repeatedly adjust the third sizes of the third dummy patterns 140 in each sub-region according to the difference between the third density Z and the target density after obtaining the sub-regions 1001, 1002, 1003 . . . 100n. By adjusting the sizes of the third dummy patterns 140 in each sub-region repeatedly, the pattern densities in the sub-regions are optimized and equalized. Accordingly, the pattern density in the whole layout region 100 is equalized and a semiconductor layout pattern having superior uniformity that is beneficial to the CMP process is obtained. Consequently, the CMP result is consequently improved.

Figure 9:
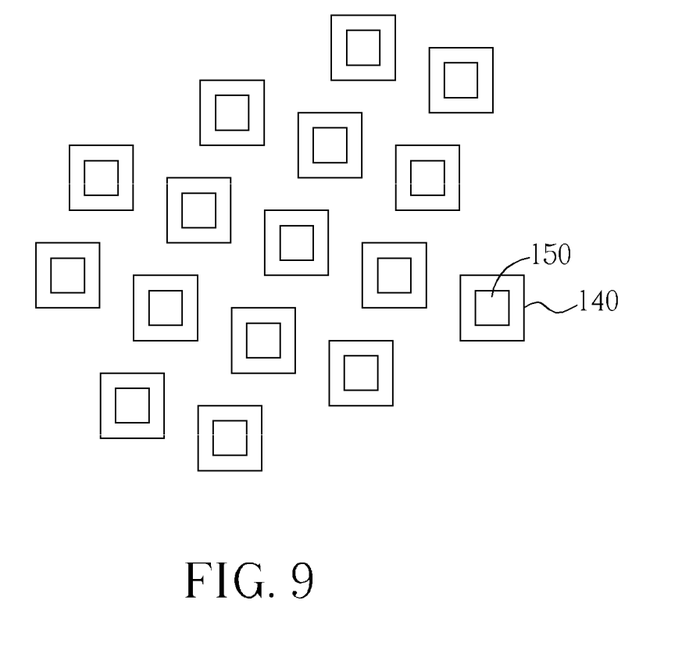
FIGS. 9-10 are schematic drawings illustrating a third preferred embodiment of the present invention.
Figure 10:
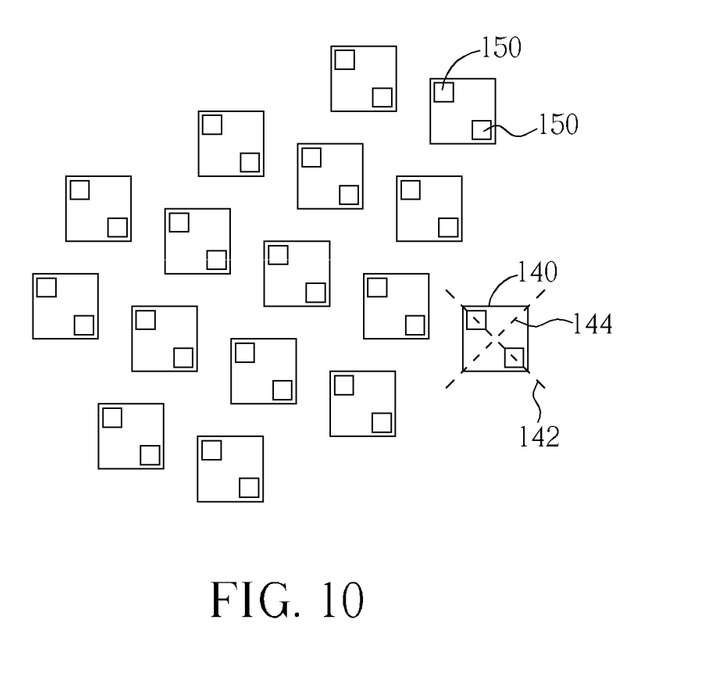

Please refer to FIGS. 9-10, which are schematic drawings illustrating a third preferred embodiment of the present invention. It is noteworthy that because the third preferred embodiment is related to the third dummy patterns 140 disclosed in the first and second preferred embodiments, only the third dummy patterns 140 are illustrated in FIGS. 9-10 for descriptively illustrating and emphasizing the spatial relationship between the preferred embodiment and the third dummy patterns 140. According to the third preferred embodiment, when the semiconductor layout pattern provided by the first preferred embodiment and the second preferred embodiment is an interconnect layout pattern which includes the first dummy patterns 120, the second dummy patterns 130, the third dummy patterns 140 and the device layout pattern 110, and the device layout pattern 110 includes trench patterns and dummy patterns designed by the circuit design engineer. Accordingly, the third preferred embodiment provides a via layout pattern after forming the above mentioned semiconductor layout pattern. The via layout pattern includes the via layout pattern designed by the circuit design engineer, the dummy patterns (not shown) designed by the circuit design engineer, and a plurality of via dummy patterns 150 for equalizing pattern density of the via layout pattern. Furthermore, after forming the via dummy pattern 150 in an object layer and filling the via dummy pattern 150 with metal material, the filled via dummy pattern 150 is able to improve the strength of the object layer, typically the low dielectric constant (low-k) material layer. As shown in FIG. 9, the via dummy patterns 150 are rectangular dummy patterns, and preferably are square dummy patterns. A length $l_3$ and a width $w_3$ of the via dummy patterns 150 is between 72 nm and 180 nm. Furthermore the shapes and sizes of each third dummy pattern 150 are identical.

More important, the via dummy patterns 150 are positioned corresponding to the third dummy patterns 140. As shown in FIG. 9, the via dummy patterns 150 are positioned corresponding to a center of each third dummy pattern 140. Therefore the via dummy patterns 150 are positioned in a spatial range within the third dummy patterns 140 and overlapping to the third dummy patterns 140. In another exemplar, the via dummy patterns 150, as show in FIG. 10, are positioned along a diagonal line of each third dummy pattern 140. Therefore the via dummy patterns 150 are positioned in a spatial range within the third dummy patterns 140 and overlapping to the third dummy patterns 140. Additional, the via dummy patterns 150 in different layer are arranged differently. For example, the via dummy patterns 150 in odd layer are arranged along a diagonal line 142 of the third dummy patterns 140 while the via dummy patterns 150 in the even layer are arranged along a diagonal line 144 of the third dummy patterns 140, and the diagonal line 142 and the diagonal line 144 are crisscross to each other.

According to the third preferred embodiment, the via dummy patterns 150 are provided to improve strength of the low-k material layer of the interconnect. It is noteworthy that the via dummy patterns 150 of the third preferred embodiment are also positioned corresponding to the third dummy patterns 140, specifically, the via dummy patterns 150 are arranged in a spatial range within the third dummy patterns 140 and overlapping to the third dummy patterns 140. Because the third dummy patterns 140 are formed farther from the device layout pattern 110, the via dummy patterns 150 formed corresponding to the third dummy patterns 140 obtain a farther distance from the device layout pattern 110 accordingly. In other words, a spacing width between a via dummy pattern 150 proximal to the device layout pattern 110 and the device layout pattern 110 is substantially the same with the spacing width $c_1$ that between a third dummy pattern 140 proximal to the device layout pattern 110 and the device layout pattern 110. The spacing widths are larger than 3 μm.

Accordingly, when arrangement of the device layout pattern 110, the first dummy pattern 120, the second dummy patterns 130 and the third dummy patterns 140 have to be changed due to requirement to product or process for forming the interconnects, the layout pattern of the via dummy patterns 150, which are farther from the device layout pattern 110, still remain impervious and unchanged because the via dummy patterns 110 are not overlapped with the device layout pattern 110. Therefore cost and waste for reforming the layout pattern on a photomask is economized. In other words, the via dummy patterns 150 provided by the third preferred embodiment has the advantage that farther from the device layout pattern 110, thus a buffer area is obtained to avoid changing to the via layout pattern even the corresponding layout pattern has to be changed.

In addition, according to the method for generating the dummy patterns provided by the present invention, the semiconductor layout patterns obtained according to the first, second and third preferred embodiments are outputted on a photomask, then, the semiconductor layout pattern can be transferred into an object layer for performing processes necessary to form the IC. In other words, the dummy pattern provided by the present invention includes not only the dummy patterns outputted on the photomask, but also the dummy patterns transferred to the object layer.

Furthermore, the second dummy patterns 130 and the third dummy patterns 140 formed in different layers includes a predetermined relative arrangement. For example, the second dummy patterns 130 are arranged in a spatial range within the third dummy patterns 140 and overlapping to the third dummy patterns 140, but not limited to this. Due to the special relative arrangement for the second dummy patterns 130 and the third dummy patterns 140, reduction of parasitic capacitance is optimized.

As mentioned above, according to the dummy patterns and method for generating the dummy patterns provided by the present invention, the third dummy patterns having the second density (the target density) corresponding to the first density of the layout pattern is formed in the layout region for preliminarily equalizing the pattern densities in the layout region. Then, the layout region is divided into the sub-regions for checking sub-region by sub-region and thus the third density of each sub-region is obtained. Thereafter, the size of the third dummy patterns in each sub-region is adjusted according the difference between the third density and the second density. Therefore the pattern densities in each sub-region are further precisely adjusted. In other words, by adjusting size of the third dummy patterns in each sub-region, the pattern densities, which are originally different from each other, of the sub-regions are smartly equalized. Accordingly, the sub-regions obtaining equalized densities are beneficial to the CMP process and thus improve the CMP result. Additionally, the dummy patterns and method for generating the dummy patterns provided by the present invention, also improves other process result such as the etching result of the patterning process.

Those skilled in the art will readily observe that numerous modifications and alterations of the device and method may be made while retaining the teachings of the invention.

What is claimed is:

1. A method for generating dummy patterns comprising steps of:
   providing a layout region having a layout pattern with a first density;
   inserting a plurality of first dummy patterns with a second density corresponding to the first density in the layout pattern;
   dividing the layout region into a plurality of sub-regions, each sub-region comprising a third density;
   adjusting a size of the first dummy pattern in each sub-region according to a difference between the second density and the third density; and
   outputting the layout pattern and the first dummy patterns on a photomask.

2. The method for generating dummy patterns according to claim 1, wherein the layout pattern comprises at least a device layout pattern, a plurality of second dummy patterns and a plurality of third dummy patterns.

3. The method for generating dummy patterns according to claim 2, wherein the device layout pattern comprises interconnect layout patterns or circuit layout patterns.

4. The method for generating dummy patterns according to claim 2, wherein the second dummy patterns and the third dummy patterns are sequentially inserting in the device layout pattern before forming the first dummy patterns.

5. The method for generating dummy patterns according to claim 2, wherein the second dummy patterns comprise bar-like dummy patterns and the third dummy patterns comprise rectangular dummy patterns.

6. The method for generating dummy patterns according to claim 2, wherein the second dummy patterns comprise varied sizes and the third dummy patterns comprise fixed sizes.

7. The method for generating dummy patterns according to claim 6, wherein the third dummy patterns are smaller than the first dummy pattern.

8. The method for generating dummy patterns according to claim 1, wherein the sub-regions overlap each other.

9. The method for generating dummy patterns according to claim 1, further comprising repeatedly performing a cycle having the steps of dividing the layout region into the sub-regions with the third density and adjusting the size of each first dummy pattern according to the difference between the third density and the second density.

10. The method for generating dummy patterns according to claim 9, wherein sizes of the sub-regions are different in each cycle when performing the step of dividing the layout region into the sub-regions with the third density region.

\* \* \* \* \*